United States Patent
Niknafs et al.

(10) Patent No.: US 7,775,507 B2
(45) Date of Patent: Aug. 17, 2010

(54) PACKING ELEMENTS FOR MASS TRANSFER APPLICATIONS

(75) Inventors: Hassan S. Niknafs, Stow, OH (US); Robert L. Miller, Stow, OH (US); Daniel C. Sherman, Hudson, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 254 days.

(21) Appl. No.: 11/982,831

(22) Filed: Nov. 5, 2007

(65) Prior Publication Data

US 2009/0115077 A1    May 7, 2009

(51) Int. Cl.
B01F 3/04    (2006.01)
(52) U.S. Cl. ................... 261/94; 261/DIG. 72
(58) Field of Classification Search ............. 261/94–98, 261/DIG. 72; 422/177, 211; 210/150, 151; 202/158; 96/290; 95/211, 235
See application file for complete search history.

(56) References Cited

U.S. PATENT DOCUMENTS

| | | | |
|---|---|---|---|
| 578,548 A | | 3/1897 | Deruelle |
| 2,172,714 A | * | 9/1939 | Schack et al. ............ 165/9.1 |
| 2,571,958 A | * | 10/1951 | Slaughter et al. ........... 261/95 |
| 3,914,351 A | * | 10/1975 | McKeown et al. ........... 261/98 |
| 4,067,936 A | * | 1/1978 | Ellis et al. ................. 261/98 |
| 4,197,264 A | * | 4/1980 | Degg ........................ 261/98 |
| 4,490,312 A | * | 12/1984 | Furr ........................ 261/98 |
| 4,511,519 A | * | 4/1985 | Hsia ........................ 261/94 |
| 4,726,918 A | * | 2/1988 | Carson ..................... 261/94 |
| 5,304,423 A | * | 4/1994 | Niknafs et al. ............ 428/402 |
| 5,688,444 A | | 11/1997 | Koshy |
| 5,730,916 A | * | 3/1998 | Kunzel et al. ............ 264/29.4 |
| 5,747,143 A | * | 5/1998 | Niknafs .................... 428/174 |
| 5,783,069 A | * | 7/1998 | Frank ...................... 210/150 |
| 5,871,674 A | * | 2/1999 | Leva ........................ 261/94 |
| 6,007,915 A | * | 12/1999 | Rukovena ................. 428/397 |
| 6,387,534 B1 | * | 5/2002 | Niknafs .................... 428/596 |
| 2003/0160342 A1 | * | 8/2003 | Niknafs et al. ............. 261/94 |
| 2005/0212153 A1 | * | 9/2005 | Niknafs et al. ............. 261/94 |

FOREIGN PATENT DOCUMENTS

| | | |
|---|---|---|
| DE | 9321533 U1 | 5/1999 |
| GB | 1513544 | 6/1978 |
| WO | 2008/048686 | 4/2008 |

OTHER PUBLICATIONS

International Search Report for PCT/US2008/082334 which is the PCT equivalent to the above identified application (U.S. Appl. No. 11/982,831).
Written Opinion for PCT/US2008/082334 which is the PCT equivalent to the above identified application (U.S. Appl. No. 11/982,831).

* cited by examiner

*Primary Examiner*—Richard L Chiesa
(74) *Attorney, Agent, or Firm*—Stewart A. Fraser; Thomas G. Field, III (57) ABSTRACT

The invention provides novel ceramic mass transfer packing elements with physical characteristics that maximize efficiency of mass transfer and minimize pressure drop when randomly dumped in a chemical reactor. In some embodiments, the elements may have: a ratio of surface area of the interaction zone to surface area of the flow through zone between 1:0.5 and 1:3; and the interaction zone surface area occupies between 45% and 70% of the open face surface area.

11 Claims, 6 Drawing Sheets

PACKING ELEMENTS FOR MASS TRANSFER APPLICATIONS

BACKGROUND OF THE INVENTION

This invention generally relates to a packing element for use in mass transfer applications within a chemical processing apparatus. More particularly, embodiments of this invention are concerned with a plurality of packing elements that are randomly oriented in a vessel in which two fluids are made to contact each other to facilitate a desired mass transfer interaction. Mass transfer packing elements are used in chemical plants to facilitate processes such as decomposition, absorption, distillation and scrubbing of chemicals.

Examples of packing elements for use in mass transfer applications are disclosed in the following patents: U.S. Pat. No. 5,304,423; U.S. Pat. No. 5,747,143 and U.S. Pat. No. 6,007,915.

SUMMARY

An embodiment of the present invention relates to a ceramic packing element comprising a continuous peripheral wall disposed between and terminating at a first end and a second end. The peripheral wall surrounds a passageway through the element. The passageway comprises at least one interaction zone and at least one flow through zone. Each zone is disposed through the element and each zone has a known cross sectional surface area. The element's ratio of total surface area of the interaction zone to total surface area of the flow through zone is from 1:0.5 to 1:3.

Another embodiment of the present invention relates to a ceramic packing element comprising a continuous peripheral wall disposed between a first end, a second end and surrounding a passageway through the element. The peripheral wall comprises an interior surface, an exterior surface, a first end surface and a second end surface. The passageway defines a first opening in the element's first end and a second opening in the element's second end. At least one interior wall extends radially from the peripheral wall's interior surface into the passageway. The interior wall comprises an interior surface, a first end surface and a second end surface. The element has a cross sectional surface area equivalent to the surface area of the first end. The cross sectional surface area comprises an open face surface area equivalent to the area of the first opening in the first end. The open face surface area comprises an interaction zone and a flow through zone. The interaction zone resides within 2 mm of an interior surface of the peripheral wall or the interior wall. The interaction zone occupies between 45% and 70% of the open face surface area and the flow through zone occupies the portion of the open face surface area not occupied by the interaction zone.

Another embodiment of the present invention relates to a vessel comprising a plurality of randomly packed ceramic packing elements, a first fluid flowing into the vessel and a second fluid flowing into the vessel. The first fluid contacts the packing elements and forms a thin layer thereon. The second fluid contacts the layer and interacts with the layer thereby forming a reaction product. The majority of the packing elements each comprise a continuous peripheral wall disposed between a first end and a second end. The peripheral wall surrounds at least one interaction zone and at least one flow through zone. Each zone is disposed through the element and has a surface area. The element's ratio of total surface area of the interaction zone to total surface area of the flow through zone is from 1:0.5 to 1:3.

DETAILED DESCRIPTION

As used herein, the phrase "chemical processing apparatus" is intended to describe equipment, such as tanks, burners, combustion chambers, piping, etc., that receives one or more raw materials and then chemically and/or physically converts it to one or more end products that are discharged from the apparatus. The conversion may involve desorption or absorption, a physical change (e.g., liquid to gas) to the raw material's state of matter and/or an increase or decrease in the temperature of the raw material. Chemical reactors are widely used in chemical manufacturing industries for a variety of purposes and are considered to be a subset of the phrase chemical processing apparatus.

The phrase "mass transfer", when used herein, may be defined as the technology for moving one species in a mixture relative to another, and it consists basically of two types of operations: separation of components from each other or mixing them together. The mixture, which may be referred to herein as a fluid, may be a gas or a liquid.

Figure 1:
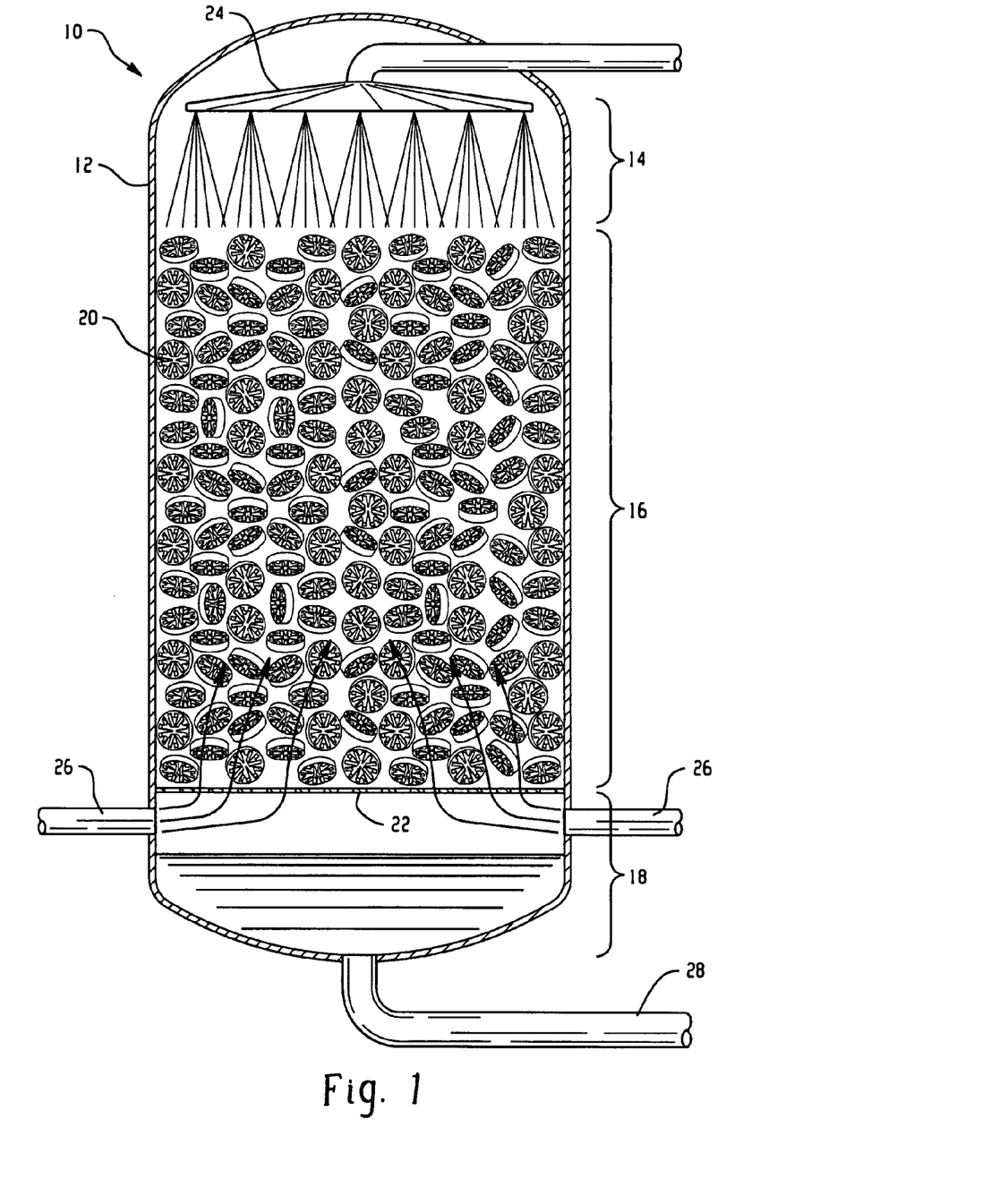
FIG. 1 is a cross sectional view of a chemical apparatus.

Referring now to the drawings, shown in FIG. 1 is a schematic drawing of an embodiment of a chemical processing apparatus 10 which could be used, for example, to produce sulfuric acid. In this embodiment, the processing apparatus includes reaction vessel 12 which can be generally divided into reactant entry layer 14, transfer layer 16 and product collection layer 18. A plurality of randomly oriented packing elements 20, which may be referred to herein as a "bed" of packing elements, fills the majority of the transfer layer and is supported by porous screen 22 which has openings small enough to prevent passage of the packing elements and large enough to permit a liquid to easily flow therethrough. While the embodiment of FIG. 1 uses only packing elements according to an embodiment of this invention, a bed may employ mixtures of packing elements. In one embodiment, at least a majority of the elements are packing elements according to an embodiment of this invention. Above the transfer layer is an entry layer for one of the reactants. A reactant, such as a dilute solution of sulfuric acid, enters the vessel and is distributed across the top of the bed of packing elements by distribution mechanism 24. As the reactant flows down and through the randomly oriented packing elements, gas comprising $SO_3$ flows through gas inlet pipes 26 and into the transfer layer near the lower portion of the bed of packing elements. As the $SO_3$ gas moves upwardly toward the top of the bed and the reactant flows toward the bottom of the bed, at least a portion of the $SO_3$ is absorbed by the reactant when the reactant flows over and wets the surfaces of the packing elements. Sulfuric acid having a higher concentration of $SO_2^-$ is formed when the $SO_3$ reacts with the reactant. The sulfuric acid having the enhanced concentration flows through the bed of packing elements, the porous support screen, and then collects in product collection layer 18. Discharge pipe 28 at the bottom of the collection layer may be used to remove the sulfuric acid from the vessel.

When used in a chemical apparatus as described in FIG. 1, the packing elements of this invention may be considered to be randomly oriented if they have been dumped into the reaction vessel without attempting to place or otherwise physically restrain the final orientation of the packing elements in the vessel. While some packing elements in a bed of elements may tend to rotate to a horizontal or vertical orientation during the fall into the vessel, the elements are still considered to be randomly oriented if the individual elements are not deliberately oriented in the vessel during the loading process.

Figure 2:
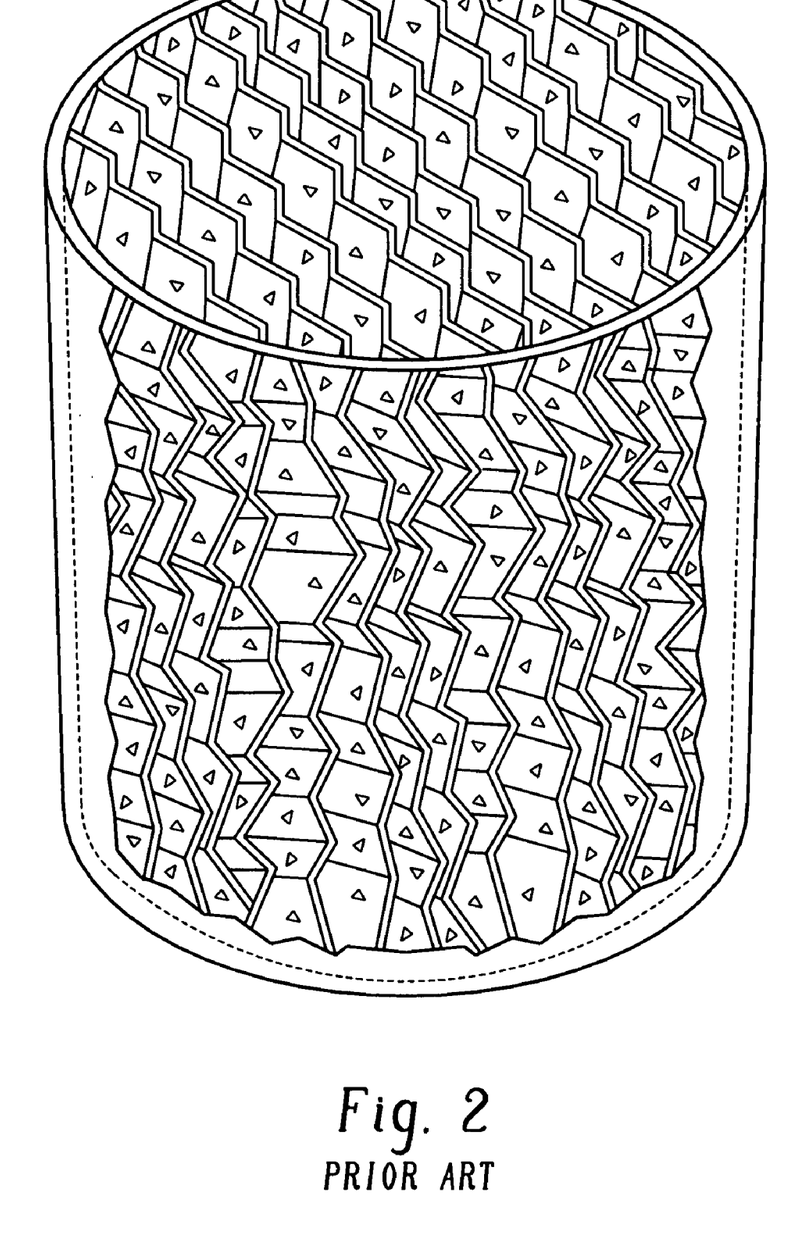
FIG. 2 is a cross sectional view of commercially available structured ceramic media for use in a mass transfer reactor.

In contrast to the randomly oriented packing elements of this invention, structured packing elements are carefully placed and deliberately oriented in a reaction vessel. Shown in FIG. 2 is an example of commercially available structured packing that utilizes fluted ceramic sheets that have been assembled to form a tubularly shaped and highly organized array of surfaces that serve as reaction surfaces for mass transfer applications. Because the sheets have essentially the same shape and size, each one must be rotated relative to its neighbors to create the desirable openings and prevent nesting of the sheets. The labor costs and additional down time associated with loading the structured packing elements, relative to the costs and time required to load an equivalent amount of randomly oriented packing elements, increases the cost of operating the mass transfer process and therefore may be undesirable.

Within the technical field of mass transfer packing elements, some engineers believe that the most efficient mass transfer elements are those with the largest effective geometric surface area per unit volume of the bed of packing. The geometric surface area is the element's total surface area which is determined by summing the surface areas of the individual surfaces that define the boundaries of the element.

However, all portions of the packing element's geometric surface area may not be equally effective at facilitating mass transfer. The effectiveness or, conversely, the ineffectiveness of the packing element's surface area can be impacted by several of the packing element's physical attributes. As used herein, the packing element's effective surface area is any surface of the packing element that may be wetted by one of the fluid reactants, thereby creating a film of the reactant on the surface of the element, and, at the same time, the other reactant is able to contact the film. These two conditions should occur simultaneously. Any surface of the packing element that cannot be simultaneously wetted by the first fluid and contacted by the second fluid is known herein as ineffective surface area. While some packing elements may have a large geometric surface area, the quantity of effective surface area may be too low to be commercially viable. Other packing elements may have a high percentage of effective surface area but the total geometric surface area is so low that the amount of effective surface area per packing element is too low to be commercially viable. The inventors of this application have conceived of packing elements that have sufficient effective surface area and provide the desired ratios of open face surface area to cross sectional surface area and interaction zone surface area to flow through zone surface area as will be described below.

Many attempts have been made to design randomly oriented packing elements with maximized geometric surface area. However, the inventors of this application have recognized that the geometric surface area is not the only parameter, and may not be the dominant parameter, that can be specified in order to attain the desired mass transfer efficiency in a particular reactor. Other parameters, such as the ratio of open face surface area to cross sectional surface area and the ratio of the interaction zone's surface area to the flow through zone's surface area may be equally important to or more important than maximizing the geometric surface area. Yet other characteristics of the packing elements that may be considered when designing a packing element for use in a vessel include thermal stability at high temperatures and corrosion resistance. For example, mass transfer packing elements made of metal have been commercially available for many years. However, many metals, particularly the more common metals, are inherently susceptible to corrosion in concentrated acid such as sulfuric acid. Other packing elements have been made of plastic in order to reduce the cost of manufacturing the elements and maximize the element's geometric surface area. While these objectives may have been achieved, plastic may not be thermally stable at the high temperatures typically encountered in many chemical reactors. In contrast to packing elements made of metal or plastic, packing elements made of ceramic provide greater thermal stability and corrosion resistance as desired to function in many mass transfer applications. Balancing all of these requirements, which may be in competition with one another, may require considerable skill to achieve an advantageous design.

Shown in FIGS. 3A to 3D are drawings of a first embodiment of a packing element 30 of this invention. Element 30 comprises a continuous peripheral wall 32 that includes interior surface 34, exterior surface 36, first end surface 38 and second end surface 40. As used herein, the term "continuous" means that the wall has no openings in it from its interior surface to its exterior surface. Any opening through the wall could decrease the wall's interior surface area which would reduce the surface area upon which mass transfer could take place. The wall circumscribes passageway 42 which extends through the element from the first end surface to the second end surface. The passageway defines first opening 44 in the first end and second opening 46 in the second end. The element has a cross sectional surface area that is equivalent to the entire surface area of the first end which is delineated by the series of parallel lines in FIG. 3B. The cross sectional surface area includes an open face surface area which is equivalent to the surface area of the first opening in the first end and is delineated by the series of parallel lines in FIG. 3C. The element also includes long interior wall 48 and short interior wall 49 (see FIG. 3A) which both extend radially from the peripheral wall's interior surface into the passageway. The length of the long interior wall may be twice the length of the short interior wall. The interior walls include interior surface 50, first end 52 and second end 54. The first end's open face surface area includes interaction zone 56 and flow through zone 58 (see FIG. 3D). Packing element 30 has a diameter D, an axial length L and a uniform cross section which means that the cross section of the element is essentially the same at any point along its axial length.

As used herein, the interaction zone is the space located within 2 mm of the interior surface of the peripheral wall or the interior surface of the interior wall. When a plurality of the packing elements are randomly disposed in the reactant layer of a chemical reactor, a packing element's interaction zone is the space within which the liquid fluid, known herein as the first fluid, wets the surface of the packing element thereby creating a thin film of liquid on the interior surface(s) of the element and the other fluid, known herein as the second fluid, contacts the thin film thereby facilitating the desired mass transfer. Even though portions of the exterior surfaces of the element may facilitate mass transfer, as defined herein, the interaction zone does not include the exterior surface of the peripheral wall nor the surfaces of the first end or second end because portions of these surfaces may not be available if the packing element abuts the wall of the reactor or rests against an adjacent packing element. In contrast, regardless of the orientation or position of the individual packing element in a bed of packing elements, the interior surfaces of the individual packing element's peripheral wall and interior wall(s) are typically not blocked from contacting one or both fluids by either the reactor wall or an adjacent packing element.

As used herein, the flow through zone is the portion of the open face surface area that is not occupied by the interaction zone. Therefore, the area of the flow through zone is determined by subtracting the area of the interaction zone from the area of the open face surface area. The functions of the flow through zone are (1) to allow the first and second fluids that do not contact this element to pass through the packing element and then contact one another on the surface of another element; and (2) allow the reaction product to flow to the product collection layer.

Figure 3A:
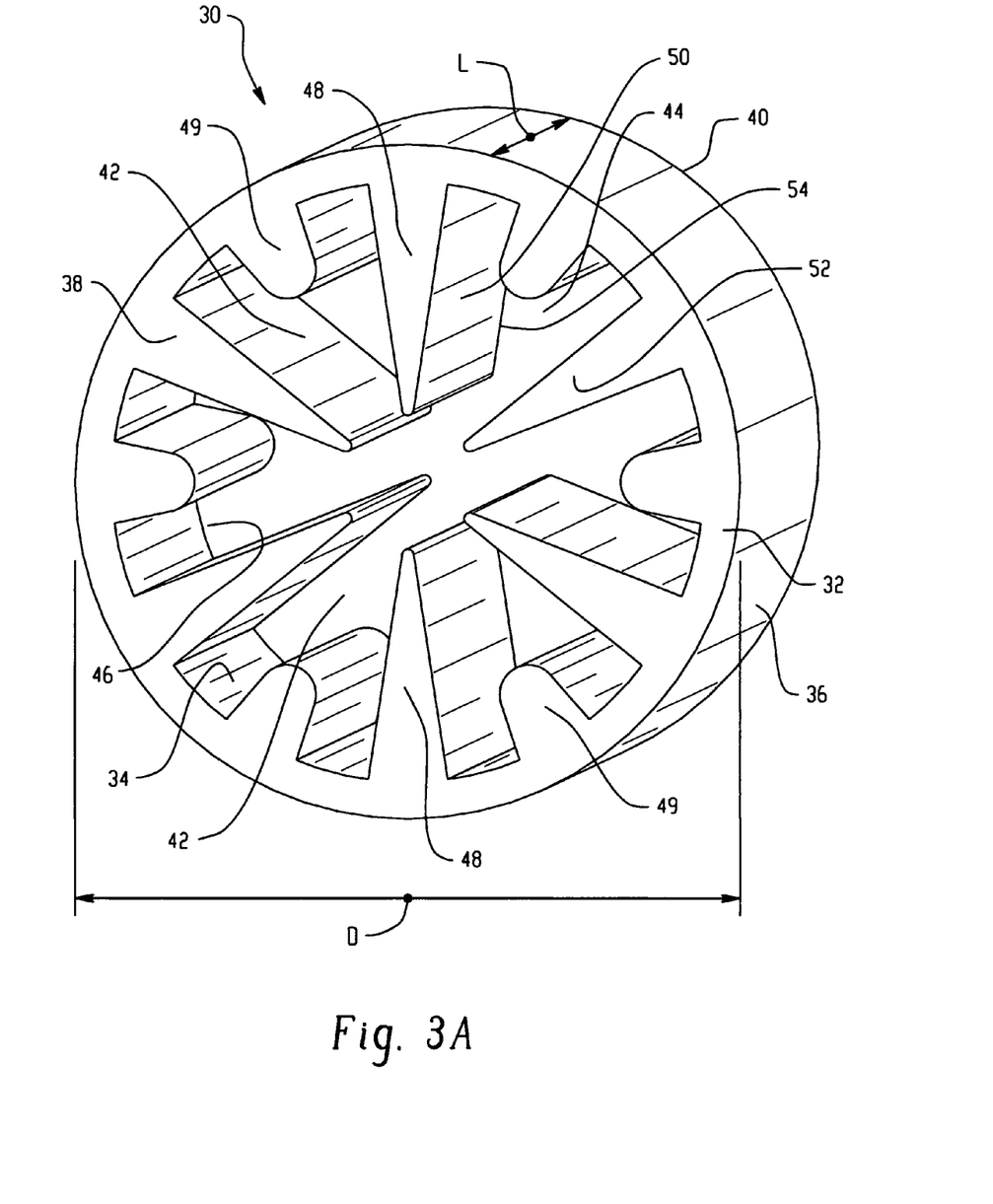
FIG. 3A shows a perspective view of a first embodiment of the present invention.
Figure 3B:
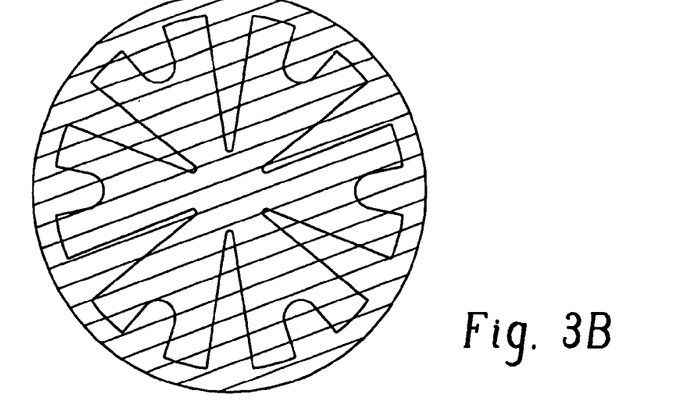
FIGS. 3B, 3C and 3D are cross sectional views of the embodiment shown in FIG. 3A.
Figure 3C:
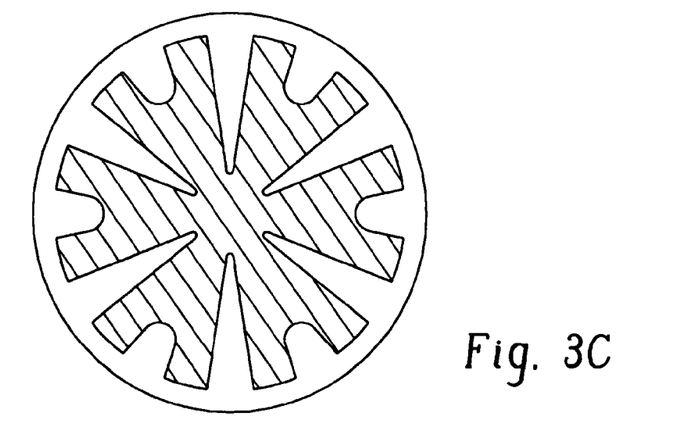
Figure 3D:
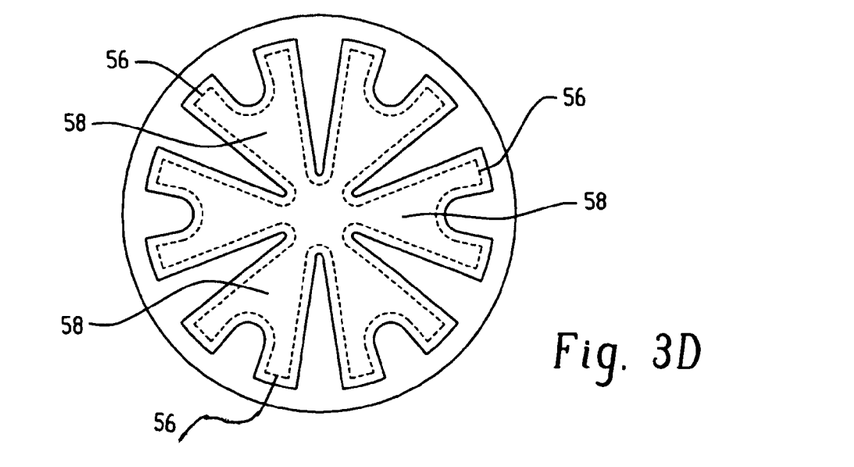

One attribute that may be used to characterize a randomly oriented mass transfer packing element is the ratio of the element's diameter (D) to its length (L) as shown in FIG. 3A. Designing the packing element to have a D:L ratio between 2:1 and 15:1, more specifically between 3:1 and 8:1, even more specifically between 4:1 and 6:1, results in the element having a generally planar shaped configuration which may tend to orient more closely to a horizontal position rather than a vertical position when randomly loaded into a vessel such as a chemical reactor. If the peripheral wall of the element forms a polygon, such as pentagon or hexagon, rather than a circle as disclosed in FIG. 3A, then the diameter is defined as the widest distance across the element's first end. If the length of the element varies between the ends, then the length is defined as the greatest distance measurable between the ends.

A performance characteristic of a mass transfer packing element is commonly known as "pressure drop" which is the pressure differential of the fluids from the inlet to outlet of the reaction vessel caused by the resistance contributed by the packing elements located within the vessel. The pressure drop associated with a particular randomly oriented packing element may be significantly impacted by the amount of open face surface area incorporated in the element. The higher the percentage of open face surface area, which may be expressed as a percentage of the cross sectional surface area, the lower the pressure drop within the reactor. Conversely, as the amount of open face surface area decreases, the pressure drop may increase which could cause an undesirable increase in the cost of operating the reactor.

Balancing the need to provide adequate surface area for the mass transfer to occur as efficiently as desired while also adequately controlling the pressure drop within the reactor may be achieved by designing packing elements that comply with one or more of the following physical relationships which can be determined by orienting the packing element so that a free falling fluid flows from the top of the packing through a passageway to the bottom of the packing element and then using the top view of the packing elements to determine the following parameters. First, controlling the ratio of the surface area of the interaction zone to the surface area of the flow through zone to lie between 1:0.5 and 1:3, more specifically, 1:0.6 and 1:1.5. Second, restricting the surface area of the interaction zone to between 45% and 70%, more preferably between 50% and 65%, of the open face surface area. Third, limiting the flow through zone's surface area to 30% to 55%, more specifically 35% to 50%, of the open face surface area. Fourth, limiting the open face surface area to 30% to 60%, more specifically 40% to 55%, of the cross sectional surface area. Similarly, the combined surface area of the peripheral wall's first end and the interior wall's first end should be limited to between 40% to 75%, more specifically between 45 and 70%, of the cross sectional surface area. Fifth, controlling the D:L ratio to between 2:1 and 15:1, more specifically between 3:1 and 7:1. Packing elements that meet one or more of these physical relationships may provide improved performance in a mass transfer reactor relative to packing elements that do not meet these relationships.

One of the physical attributes that can influence the ease with which a portion of the element's surface may be wetted is the distance between opposing surfaces within a packing element. If the distance between two opposing surfaces is too small, such as less than 4 mm, which is defined herein as twice the depth of the interaction zone, then the surface area of the element's total flow through zone may be too small relative to the surface area of the element's total interaction zone and neither surface may be fully wetted by the first fluid and simultaneously available to the second fluid. Consequently, each of the opposing surfaces would be defined herein as an ineffective portion of the geometric surface area. Ineffective surface area and a low proportion of flow through zone surface area may be problematic in packing elements that incorporate many small openings through the element from the first end to the second end.

Figure 4:
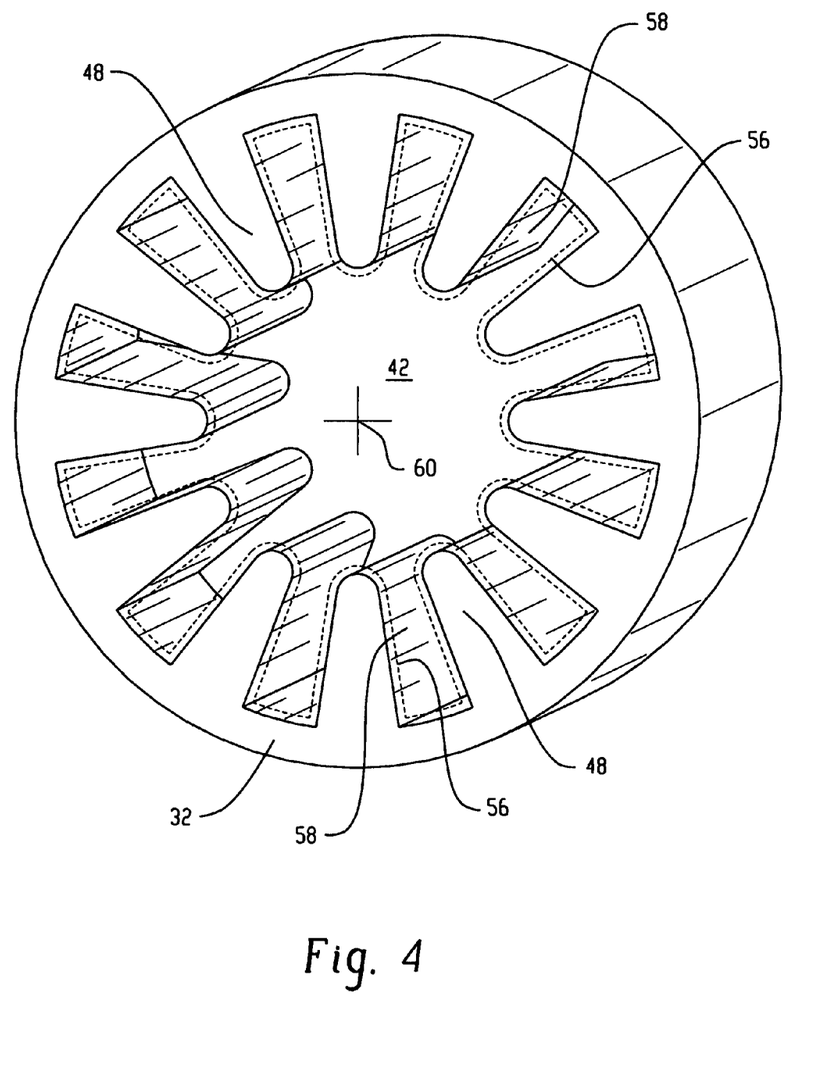
FIG. 4 shows a perspective view of a second embodiment of the present invention.

Shown in FIG. 4 is a second embodiment of a packing element of this invention. Similar to the embodiment disclosed in FIGS. 3A to 3D, the embodiment shown FIG. 4 includes continuous peripheral wall 32, passageway 42, several interior walls 48, interaction zone 56 and flow through zone 58. In contrast to the embodiment shown in FIGS. 3A to 3D, the interior walls in FIG. 4 project the same distance from the peripheral wall radially inwardly toward the center 60 of the packing element. FIG. 4 discloses an even number of walls equally spaced around the perimeter of the element. An embodiment that includes an odd number of walls spaced unequally around the perimeter of the element is also feasible.

Figure 5:
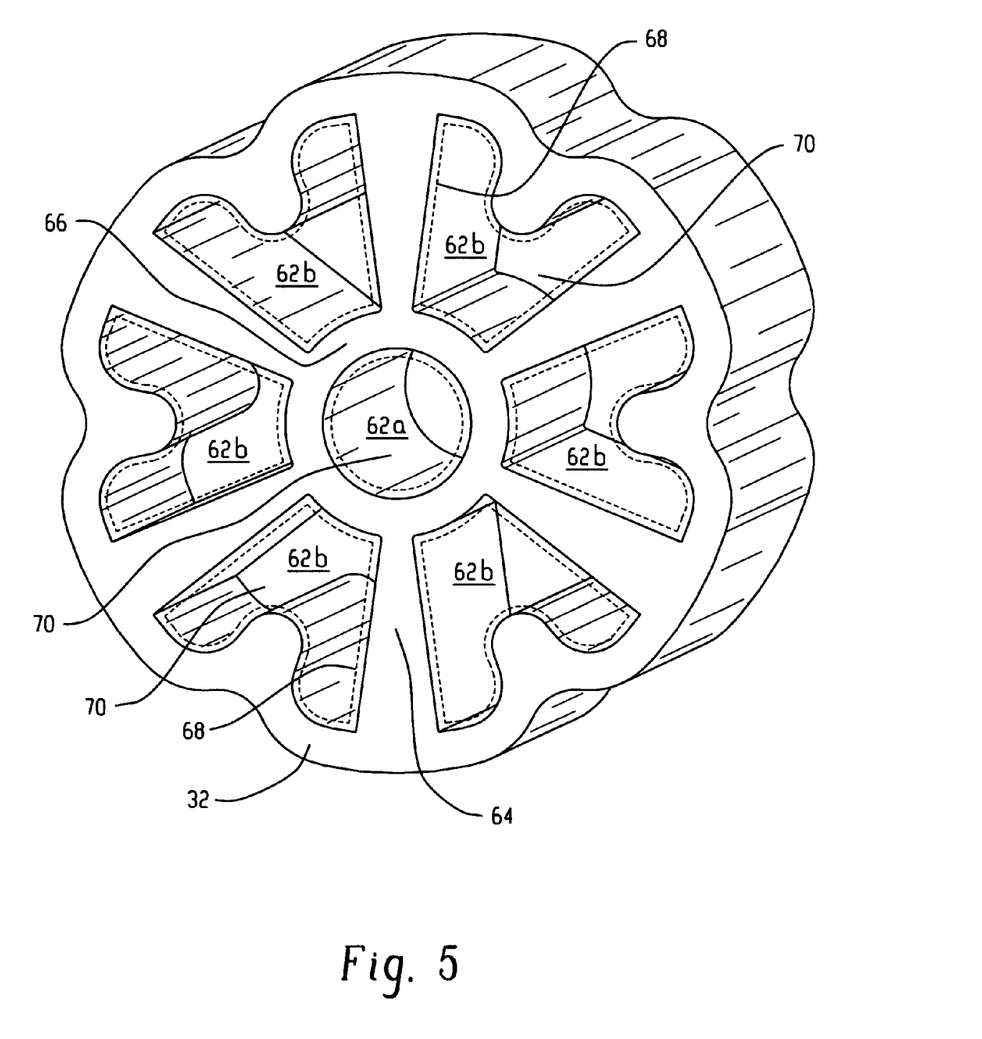
FIG. 5 shows a perspective view of a third embodiment of the present invention.

Another embodiment of a packing element of this invention is shown in FIG. 5 which includes continuous peripheral wall 32, central passageway 62a and six identical passageways 62b disposed about the central passageway, several interior walls 64 that abut connection ring 66 which defines and surrounds central passageway 62a, six interaction zones 68 and six flow through zones 70. The central passageway may be referred to herein as a first through hole. Each of the six identical passageways may be referred to herein as a second through hole. In FIG. 5, the passageway through the element includes the first and second through holes. The first through hole creates a first pressure zone having a first hydraulic diameter. Each of the second through holes creates a second pressure zone having a second hydraulic diameter. Preferably, the second hydraulic diameter is at least 10% greater than the first hydraulic diameter. In contrast to the unified passageway shown in FIG. 4, the passageway in FIG. 5 includes the seven through holes that are physically separated from one another. Similarly, the interaction zone in FIG. 5 includes seven separate interaction zones 68 that collectively make up the element's interaction zone. Likewise, the flow through zone in FIG. 5 includes seven separate flow through zones 70 that collectively make up the element's flow through zone.

Embodiments of the ceramic packing elements of this invention can be produced by an extrusion process or a dry pressing process. The elements can have an essentially uniform cross section along one axial direction which may provide an axis of radial symmetry and/or a plane of symmetry. For example, in FIG. 4, the axis of symmetry is located at the center 60 of the element and extends in the length direction as disclosed in the description of FIG. 3A. The element's planar symmetry is visually disclosed in FIG. 3A.

The ceramic packing elements of this invention can be formed from any suitable ceramic material such as natural or synthetic clays, zeolites, cordierites, aluminas, zirconia, silica, or mixtures of these. The formulation can be mixed with bonding agents, extrusion aids, pore formers, lubricants and the like.

A plurality of packing elements having the general shape shown in FIG. 5 was made as follows. Approximately 60 weight percent clay and 40 weight percent feldspar were mixed with one another to form a dry flowable powder. The powder was then blended with water to form a damp, manually malleable mixture. The mixture was then extruded and cut at regular intervals to form structures having the same shape as the cross section shown in FIG. 5. The structures were dried and then fired at 1160° C. with a three hour soak time thereby sintering the ceramic components and forming a rigid packing element. The sintered elements had the physical characteristics shown below in Table 1. See the column labeled FIG. 5. Based on the drawings in FIGS. 3A-3D and FIG. 4, the same physical characteristics were calculated and are shown in the columns labeled FIG. 3A and FIG. 4, respectively.

TABLE 1

|  | FIG. 3A | FIG. 4 | FIG. 5 |
| --- | --- | --- | --- |
| Cross sectional surface area (cm$^2$) | 31.6 | 31.6 | 30.7 |
| Open face surface area (cm$^2$) | 16.5 | 5.8 | 12.9 |
| Interaction zone surface area (cm$^2$) | 8.8 | 8.9 | 8.1 |
| Flow through zone surface area (cm$^2$) | 7.7 | 6.9 | 4.8 |
| Interaction Zone/Flow Through Zone | 1:0.9 | 1:0.8 | 1:0.6 |
| Interaction Zone/Open face surface area (%) | 53.3 | 56.3 | 62.8 |
| Flow through zone/Open face surface area (%) | 46.7 | 43.7 | 37.2 |
| Open face surface area/Cross sectional surface area (%) | 52.2 | 50.0 | 42.0 |
| Diameter (D) (cm) | 6.4 | 6.4 | 6.4 |
| Length (L) (cm) | 1.3 | 1.3 | 1.3 |
| D:L | 4.9 | 4.9 | 4.9 |

The above description is considered that of representative embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

What is claimed is:

1. A ceramic packing element, comprising:
   (a) a continuous peripheral wall disposed between a first end and a second end and surrounding a passageway through said element, said peripheral wall comprising an interior surface, an exterior surface, a first end surface and a second end surface, said passageway defining a first opening in said element's first end and a second opening in said element's second end;
   (b) at least one interior wall extending radially from said peripheral wall's interior surface into said passageway, said interior wall comprising an interior surface, a first end surface and a second end surface; and
   (c) wherein said element has a cross sectional surface area equivalent to the surface area of said first end, said cross sectional surface area comprising an open face surface area equivalent to the area of said first opening in said first end; said open face surface area comprising an interaction zone and a flow through zone, wherein said interaction zone is that portion of the open face surface area within 2 mm of an interior surface of said peripheral wall or said interior wall, said interaction zone occupies between 45% and 70% of said open face surface area, and said flow through zone occupies the portion of the open face surface area not occupied by the interaction zone.

2. The ceramic packing element of claim 1 wherein the interaction zone surface area occupies between 45% and 70% of the open face surface area.

3. The ceramic packing element of claim 2 wherein the interaction zone surface area occupies between 50% and 65% of the open face surface area.

4. The ceramic packing element of claim 1 wherein the element's ratio of interaction zone surface area to flow through zone surface area is from 1:0.5 to 1:3.

5. The ceramic packing element of claim 4 wherein the element's ratio of interaction zone surface area to flow through zone surface area is from 1:0.6 to 1:1.5.

6. The ceramic packing element of claim 1 wherein said passageway comprises at least two interaction zones and at least two flow through zones.

7. The ceramic packing element of claim 1 further comprising a plurality of interior walls extending radially from said peripheral wall's interior surface into said passageway.

8. The ceramic packing element of claim 7 wherein each interior wall projects the same distance from the peripheral wall into said passageway.

9. The ceramic packing element of claim 7 wherein said plurality of interior walls comprises a first interior wall and a second interior wall, said first interior wall projects at least 10% further into said passageway than said second interior wall.

10. The ceramic packing element of claim 1 wherein said open face surface area occupies between 30% and 60% of said cross sectional surface area.

11. The ceramic packing element of claim 10 wherein said open face surface area occupies between 40% and 55% of said cross sectional surface area.

* * * * *